United States Patent
Bi et al.

(10) Patent No.: US 8,002,190 B2
(45) Date of Patent: Aug. 23, 2011

(54) STABILITY OF COVERT PIGMENTS

(75) Inventors: Daoshen Bi, Boxborough, MA (US);
Robert L. Jones, Andover, MA (US);
Jack Richardson, Lyman, ME (US)

(73) Assignee: L-1 Secure Credentialing, Inc.,
Billerica, MA (US)

( * ) Notice: Subject to any disclaimer, the term of this patent is extended or adjusted under 35 U.S.C. 154(b) by 297 days.

(21) Appl. No.: 11/140,613

(22) Filed: May 27, 2005

(65) Prior Publication Data
US 2006/0011730 A1 Jan. 19, 2006

Related U.S. Application Data

(60) Provisional application No. 60/575,337, filed on May 27, 2004, provisional application No. 60/580,473, filed on Jun. 16, 2004.

(51) Int. Cl.
*G06K 19/02* (2006.01)
(52) U.S. Cl. .......................... 235/488; 235/492
(58) Field of Classification Search .................. 235/488, 235/492, 491, 493, 449; 428/407, 403; 427/218, 427/128, 130
See application file for complete search history.

(56) References Cited

U.S. PATENT DOCUMENTS

| | | | | |
|---|---|---|---|---|
| 4,514,085 | A * | 4/1985 | Kaye | 356/71 |
| 5,665,429 | A * | 9/1997 | Elwakil | 427/218 |
| 5,714,291 | A | 2/1998 | Marinello et al. | |
| 5,843,333 | A * | 12/1998 | Hakemi | 252/299.5 |
| 6,187,439 | B1 * | 2/2001 | Elwakil | 428/407 |
| 6,291,121 | B1 | 9/2001 | Hollenbaugh, Jr. et al. | |
| 7,063,264 | B2 | 6/2006 | Bi et al. | |
| 7,119,759 | B2 * | 10/2006 | Zehner et al. | 345/1.1 |
| 7,258,915 | B2 * | 8/2007 | Argoitia et al. | 428/323 |
| 2003/0235690 | A1 * | 12/2003 | Bayless | 428/407 |
| 2004/0110867 | A1 * | 6/2004 | McCovick | 523/160 |
| 2005/0037192 | A1 * | 2/2005 | Argoitia et al. | 428/323 |
| 2005/0122564 | A1 * | 6/2005 | Zehner et al. | 359/296 |
| 2007/0037902 | A1 * | 2/2007 | McCovick | 523/160 |
| 2007/0227401 | A1 * | 10/2007 | Ganschow et al. | 106/400 |

* cited by examiner

*Primary Examiner* — Thien M Le
(74) *Attorney, Agent, or Firm* — Mintz Levin Cohn Ferris Glovsky and Popeo, PC

(57) ABSTRACT

A covert material for printing onto a printing medium is provided, the covert material comprising a covert pigment and a binder encapsulating the covert pigment into a particle, where the binder comprises at least one of cellulose acetate butyrate (CAB), butyral vinyl acetate, acetyl butyrate, and acetate butyrate. Alternatively, the binder comprises at least one of polyester, polyolefin, acetyl butyrate, acetate butyrate, polystyrene copolymer, and polystyrene-polyvinylpyridine. The covert material can comprise additional components, such as ethyl acetate and/or n-propyl acetate. In one embodiment, the covert pigment comprises about 0.5-5% of the covert material. In one embodiment, the binder comprises about 5-30% of the covert material. In one advantageous embodiment, the covert pigment comprises at least 2% of the covert material and the binder comprises about 20-25% of the covert material. The covert material can further comprise at least one of a colorant, a surface additive, and a magnetic particle. The covert material can be part of a toner or ink. In at least some embodiments, the particle can have many different sizes, including sizes greater than 1 micron, greater than 5 microns, and greater than 20 microns. In one embodiment, the covert printing material is constructed and arranged to be printed using a printer having a predetermined resolution, wherein the particle has a size that is substantially the same as the size of a single pixel or dot printed using the predetermined resolution. The covert material can be constructed and arranged to satisfy a predetermined number of the NCITS 322 tests.

31 Claims, No Drawings

STABILITY OF COVERT PIGMENTS

RELATED APPLICATION DATA

This application claims priority to U.S. Provisional Application Nos. 60/575,337, filed May 27, 2004; and 60/580,473 filed Jun. 16, 2004, which are hereby incorporated by reference.

This application is related to the following: Covert Variable Information on Identification Documents and Methods of Making Same (application Ser. No. 10/330,032, filed Dec. 24, 2002—Inventors Robert Jones and Daoshen Bi);

Laser Engraving Methods and Compositions, and Articles Having Laser Engraving Thereon (application Ser. No. 10/326,886, filed Dec. 20, 2002—Inventors Brian Labrec and Robert Jones);

Systems, Compositions, and Methods for Full Color Laser Engraving of ID Documents (application Ser. No. 10/330,034, filed Dec. 24, 2002—Inventor Robert Jones);

Laser Engraving Methods and Compositions, and Articles Having Laser Engraving Thereon,"(application Ser. No. 10/803,538, filed Mar. 17, 2004, inventor Brian Labrec);

Laser Engraving Methods and Compositions, and Articles Having Laser Engraving Thereon,"(application Ser. No. 10/942,321, filed Sep. 14, 2004) inventors Brian Labrec and Robert Jones);

Laser Engraving Methods and Compositions and Articles Having Laser Engraving Thereon (Application No. 60/504,352, filed Sep. 19, 2003—Inventors Brian Labrec and Robert Jones);

Increasing Thermal Conductivity of Host Polymer Used with Laser Engraving Methods and Compositions (application Ser. No. 10/677,092, filed Sep. 30, 2003);

Document Laminate Formed From Different Polyester Materials (application Ser. No. 10/692,463, filed Oct. 21, 2003, Inventor Brian Labrec);

Contact Smart Cards Having a Document Core, Contactless Smart Cards Including Multi-Layered Structure, PET-Based Identification Document, and Methods of Making Same (application Ser. No. 10/836,639, filed Apr. 29, 2004—Inventors Robert Jones and Daoshen Bi; and Identification Document having Intrusion Resistance (Application No. 60/558,177, filed Mar. 26, 2004—Inventors Robert Jones, Daoshen Bi, Tung Feng Yeh);

Ink with Cohesive Failure and Identification Document Including Same (application Ser. No. 10/329,315, filed Dec. 23, 2002—Inventors Robert Jones and Bentley Bloomberg);

U.S. Pat. No. 6,066,594, entitled "Identification Document," issued May 23, 2000, inventors Valerie E. Gunn and Janet M. Schaafner;

U.S. Pat. No. 5,334,572, entitled "Sheet Material for Thermal Transfer Imaging," issued Aug. 2, 1994, inventor Howard G. Schild;

U.S. Pat. No. 6,291,121, entitled "Fluorescent Treated External Surface Additives for Toner," issued Sep. 18, 2001, inventors William H. Hollenbaugh, Jr. et al.;

U.S. Pat. No. 5,714,291, entitled "System for Authenticating Printed or Reproduced Documents," issued Feb. 3, 1998, inventors Daniel Marinello et al.

Each of the above U.S. Patent documents is herein incorporated by reference in its entirety

TECHNICAL FIELD

The present invention generally relates to identification and security documents printed using covert pigments, and in particular, relates to improving the performance of printed materials that contain covert pigments or dyes such as materials that fluoresce under certain types of illumination.

BACKGROUND AND SUMMARY

Identification Documents

Identification documents (hereafter "ID documents") play a critical role in today's society. One example of an ID document is an identification card ("ID card"). ID documents are used on a daily basis—to prove identity, to verify age, to access a secure area, to evidence driving privileges, to cash a check, and so on. Airplane passengers are required to show an ID document during check in, security screening and prior to boarding their flight. In addition, because we live in an ever-evolving cashless society, ID documents are used to make payments, access an automated teller machine (ATM), debit an account, or make a payment, etc.

(For the purposes of this disclosure, ID documents are broadly defined herein, and include, e.g., credit cards, bank cards, phone cards, passports, driver's licenses, network access cards, employee badges, debit cards, security cards, visas, immigration documentation, national ID cards, citizenship cards, social security cards, security badges, certificates, identification cards or documents, voter registration cards, police ID cards, border crossing cards, legal instruments, security clearance badges and cards, gun permits, gift certificates or cards, membership cards or badges, etc., etc. Also, the terms "document," "card," "badge" and "documentation" are used interchangeably throughout this patent application.).

An exemplary ID document can comprise a core layer (which can be pre-printed), such as a light-colored, opaque material (e.g., TESLIN (available from PPG Industries), polycarbonate, polyethylene terephthalate (PET), polyvinyl chloride (PVC) material, etc.). The core is laminated with a transparent material, such as clear PC, PET, or PVC to form a so-called "card blank". Information, such as variable personal information (e.g., photographic information), is printed on the card blank using a method such as Dye Diffusion Thermal Transfer ("D2T2") printing (described further in commonly assigned U.S. Pat. No. 6,066,594, which is incorporated herein by reference in its entirety), laser printing, Indigo printing, Inkjet printing, etc. The information can, for example, comprise an indicium or indicia, such as the invariant or nonvarying information common to a large number of identification documents, for example the name and logo of the organization issuing the documents. The information may be formed by any known process capable of forming the indicium on the specific core material used.

To protect the information that is printed, an additional layer of transparent overlaminate can be coupled to the card blank and printed information, as is known by those skilled in the art. Illustrative examples of usable materials for overlaminates include biaxially oriented polyester or other optically clear durable plastic film (e.g., polycarbonate, PET, etc.)

Many types of identification cards and documents, such as driving licenses, national or government identification cards, bank cards, credit cards, controlled access cards and smart cards, carry thereon certain items of information which relate to the identity of the bearer. Examples of such information include name, address, birth date, signature and photographic image; the cards or documents may in addition carry other variant data (i.e., data specific to a particular card or document, for example an employee number) and invariant data (i.e., data common to a large number of cards, for example the name of an employer). All of the cards described above will hereinafter be generically referred to as "ID documents".

In the foregoing discussion, the use of the word "ID document" is broadly defined and intended to include all types of ID documents, including (but not limited to), documents, magnetic disks, credit cards, bank cards, phone cards, stored value cards, prepaid cards, smart cards (e.g., cards that include one more semiconductor chips, such as memory devices, microprocessors, and microcontrollers), contact cards, contactless cards, proximity cards (e.g., radio frequency (RFID) cards), passports, driver's licenses, network access cards, employee badges, debit cards, security cards, visas, immigration documentation, national ID cards, citizenship cards, social security cards, security badges, certificates, identification cards or documents, voter registration and/or identification cards, police ID cards, border crossing cards, security clearance badges and cards, legal instruments, gun permits, badges, gift certificates or cards, membership cards or badges, and tags. Also, the terms "document," "card," "badge" and "documentation" are used interchangeably throughout this patent application.). In at least some aspects of the invention, ID document can include any item of value (e.g., currency, bank notes, and checks) where authenticity of the item is important and/or where counterfeiting or fraud is an issue.

In addition, in the foregoing discussion, "identification" at least refers to the use of an ID document to provide identification and/or authentication of a user and/or the ID document itself. For example, in a conventional driver's license, one or more portrait images on the card are intended to show a likeness of the authorized holder of the card. For purposes of identification, at least one portrait on the card (regardless of whether or not the portrait is visible to a human eye without appropriate stimulation) preferably shows an "identification quality" likeness of the holder such that someone viewing the card can determine with reasonable confidence whether the holder of the card actually is the person whose image is on the card. "Identification quality" images, in at least one embodiment of the invention, include covert images that, when viewed using the proper facilitator (e.g., an appropriate light or temperature source), provide a discernable image that is usable for identification or authentication purposes.

Of course, it is appreciated that certain images may be considered to be "identification quality" if the images are machine readable or recognizable, even if such images do not appear to be "identification quality" to a human eye, whether or not the human eye is assisted by a particular piece of equipment, such as a special light source. For example, in at least one embodiment of the invention, an image or data on an ID document can be considered to be "identification quality" if it has embedded in it machine-readable information (such as digital watermarks or steganographic information) that also facilitate identification and/or authentication.

The terms "indicium" and indicia as used herein cover not only markings suitable for human reading, but also markings intended for machine reading. Especially when intended for machine reading, such an indicium need not be visible to the human eye, but may be in the form of a marking visible only under infra-red, ultra-violet or other non-visible radiation. Thus, in at least some embodiments of the invention, an indicium formed on any layer in an identification document (e.g., the core layer) may be partially or wholly in the form of a marking visible only under non-visible radiation. Markings comprising, for example, a visible "dummy" image superposed over a non-visible "real" image intended to be machine read may also be used.

Information Contained on Identification Documents

As those skilled in the art know, ID documents such as drivers licenses can contain information such as a photographic image, a bar code (which may contain information specific to the person whose image appears in the photographic image, and/or information that is the same from ID document to ID document), variable personal information, such as an address, signature, and/or birthdate, biometric information associated with the person whose image appears in the photographic image (e.g., a fingerprint), a magnetic stripe (which, for example, can be on the a side of the ID document that is opposite the side with the photographic image), and various security features, such as a security pattern (for example, a printed pattern comprising a tightly printed pattern of finely divided printed and unprinted areas in close proximity to each other, such as a fine-line printed security pattern as is used in the printing of banknote paper, stock certificates, and the like).

An exemplary ID document can comprise a substrate or core layer (which can be pre-printed), such as a light-colored, opaque material (e.g., polycarbonate, TESLIN (available from PPG Industries) polyvinyl chloride (PVC) material, etc). In certain instances and with certain printing or information forming technologies, variable or personalized data can be formed directly on the substrate or core layer. In other instances, the core layer may be coated and/or laminated with another material to enable printing or other methods of forming information. For example, the substrate or core layer can be laminated with a transparent material, such as clear polycarbonate or PVC to form a so-called "card blank".

Information, such as variable personal information (e.g., photographic information), can then formed on the card blank using one or more methods, such as laser xerography, Indigo, intaglio, laser engraving or marking, inkjet printing, thermal or mass transfer printing, dye diffusion thermal transfer ("D2T2") printing, (described in commonly assigned U.S. Pat. No. 6,066,594, which is incorporated herein by reference in its entirety.), etc. The information can, for example, comprise an indicium or indicia, such as the invariant or nonvarying information common to a large number of identification documents, for example the name and logo of the organization issuing the documents. The information may be formed by any known process capable of forming the indicium on the specific core material used.

Certain technologies for forming or printing information may require further protection of the information, so an additional layer of transparent overlaminate can be coupled to the core layer or card blank and the information printed thereon, as is known by those skilled in the art. Illustrative examples of usable materials for overlaminates include polycarbonate, biaxially oriented polyester, or other optically clear durable plastic film.

Manufacture and Printing Environments

Commercial systems for issuing ID documents are of two main types, namely so-called "central" issue (CI), and so-called "on-the-spot" or "over-the-counter" (OTC) issue.

CI type ID documents are not immediately provided to the bearer, but are later issued to the bearer from a central location. For example, in one type of CI environment, a bearer reports to a document station where data is collected, the data are forwarded to a central location where the card is produced, and the card is forwarded to the bearer, often by mail. Another illustrative example of a CI assembling process occurs in a setting where a driver passes a driving test, but then receives her license in the mail from a CI facility a short time later. Still another illustrative example of a CI assembling process occurs in a setting where a driver renews her license by mail or over the Internet, then receives a drivers license card through the mail.

In contrast, a CI assembling process is more of a bulk process facility, where many cards are produced in a centralized facility, one after another. (For example, picture a setting where a driver passes a driving test, but then receives her license in the mail from a CI facility a short time later. The CI facility may process thousands of cards in a continuous manner.).

Centrally issued identification documents can be produced from digitally stored information and generally comprise an opaque core material (also referred to as "substrate"), such as paper or plastic, sandwiched between two layers of clear plastic laminate, such as polyester, to protect the aforementioned items of information from wear, exposure to the elements and tampering. The materials used in such CI identification documents can offer the ultimate in durability. In addition, centrally issued digital identification documents generally offer a higher level of security than OTC identification documents because they offer the ability to pre-print the core of the central issue document with security features such as "micro-printing", ultra-violet security features, security indicia and other features currently unique to centrally issued identification documents.

In addition, a CI assembling process can be more of a bulk process facility, in which many cards are produced in a centralized facility, one after another. The CI facility may, for example, process thousands of cards in a continuous manner. Because the processing occurs in bulk, CI can have an increase in efficiency as compared to some OTC processes, especially those OTC processes that run intermittently. Thus, CI processes can sometimes have a lower cost per ID document, if a large volume of ID documents are manufactured.

In contrast to CI identification documents, OTC identification documents are issued immediately to a bearer who is present at a document-issuing station. An OTC assembling process provides an ID document "on-the-spot". (An illustrative example of an OTC assembling process is a Department of Motor Vehicles ("DMV") setting where a driver's license is issued to person, on the spot, after a successful exam.). In some instances, the very nature of the OTC assembling process results in small, sometimes compact, printing and card assemblers for printing the ID document. It will be appreciated that an OTC card issuing process is by its nature can be an intermittent—in comparison to a continuous—process.

OTC identification documents of the types mentioned above can take a number of forms, depending on cost and desired features. Some OTC ID documents comprise highly plasticized poly(vinyl chloride) or have a composite structure with polyester laminated to 0.5-2.0 mil (13-51 .mu.m) poly (vinyl chloride) film, which provides a suitable receiving layer for heat transferable dyes which form a photographic image, together with any variant or invariant data required for the identification of the bearer. These data are subsequently protected to varying degrees by clear, thin (0.125-0.250 mil, 3-6 .mu.m) overlay patches applied at the printhead, holographic hot stamp foils (0.125-0.250 mil 3-6 .mu.m), or a clear polyester laminate (0.5-10 mil, 13-254.mu.m) supporting common security features. These last two types of protective foil or laminate sometimes are applied at a laminating station separate from the printhead. The choice of laminate dictates the degree of durability and security imparted to the system in protecting the image and other data.

UV Security Features in ID Documents

One response to the problem of counterfeiting ID documents has involved the integration of verification features that are difficult to copy by hand or by machine, or which are manufactured using secure and/or difficult to obtain materials. One such verification feature is the use in the card of a signature of the card's issuer or bearer. Other verification features have involved, for example, the use of watermarks, biometric information, microprinting, covert materials or media (e.g., ultraviolet (UV) inks, infrared (IR) inks, fluorescent materials, phosphorescent materials), optically varying images, fine line details, validation patterns or marking, and polarizing stripes. These verification features are integrated into an identification card in various ways and they may be visible or invisible (covert) in the finished card. If invisible, they can be detected by viewing the feature under conditions which render it visible. At least some of the verification features discussed above have been employed to help prevent and/or discourage counterfeiting.

Covert security features are those features whose presence is not visible to the user without the use of special tools (e.g., UV or IR lights, digital watermark readers) or knowledge. In many instances, a covert security feature is normally invisible to a user. Some technologies that involve invisible features require the use of specialized equipment, such as a detector or a device capable of reading digital watermarks. One type of covert security feature is the printing of information (images, designs, logos, patterns, text, etc.) in a material that is not visible under normal lighting conditions, but can be viewed using a special non-visible light source, such as an ultraviolet (UV) or infrared (IR) light source. Use of UV and/or IR security features can be advantageous because although the devices (for example, UV and/or IR light sources) required to see and use such features are commonly available at a reasonable cost, the ability to manufacture and/or copy at least some implementations of such features is far less common and can be very costly. UV and IR based covert security features thus can help deter counterfeiters because the features cannot be copied by copiers or scanners and are extremely difficult to manufacture without the requisite know-how, equipment, and materials.

For example, the assignee of the present invention has developed and marketed a proprietary product called PolaPrime-UV™. PolaPrime-UV™ is a type of security feature. One application of PolaPrime-UV™ is for full color photo quality printing of fixed (i.e., not variable data) fluorescent images. The artwork that can be printed using PolaPrime-UV™ includes many images that can be produced with a combination of red, green, and blue phosphors. Under the appropriate light (e.g., a light source capable of providing UV light), the effect seen when viewing an image printed with PolaPrime-UV™ is similar in appearance to a television screen in that the image is formed by emission of light rather than reflection as with ink on paper. To date, PolaPrime-UV™ has been a reliable authenticator for genuine identification documents.

Printing of Covert Materials such as UV

Many images, such as color images, are formed by subtractive techniques, e.g., light is passed through absorbing dyes and the combination of dyes produce an image by sequentially subtracting cyan, magenta, and yellow components to provide the full color image. In the case of a UV fluorescing image, the UV image is formed by light emitting from fluorescing dyes or pigments as they are activated by a UV light or energy source. A UV image can be imparted to an ID document via methods such as thermal transfer or D2T2. In certain printing environments (such as printing environments that use laser printing and/or laser xerography), covert images can be imparted to documents through the toners used for printing.

Laser Printing and Toners for Laser Printing

Laser printers operate using principles of static electricity. A cylinder or drum revolves to build up and electrostatic charge. A very small laser beam is pointed towards the cylinder/drum, and the laser beam discharges the surface of the cylinder/drum in a pattern corresponding to the pattern of indicia (e.g., letters, images) to be printed. This results in the surface of the cylinder/drum having positively and negatively charged areas. A developer roller (also referred to as a pick up transfer roller) then picks up toner from a toner hopper. The medium being printed (e.g., paper, an identification document, etc.) is passed through the printer and is charged with a charge opposite to that of the toner on the drum, such that the toner is transferred from the drum to the paper. The medium being printed then passes through heated rollers to fuse the toner to the medium. Color laser printers can make multiple passes through this process, to mix the different color toners.

Toners, for at least some printers, consists of a very fine powder that is charged so that it clings only to the areas of the cylinder/drum having a charge opposite to that of the toner (e.g., positively charged toner clings only to negatively charged surface areas of cylinder/drum, and vice versa). Such toners typically comprise at least a binder resin and a colorant. Optionally, toners can include additional components such as external surface additives, magnetic particles, and/or filler material. Preferably, all of the components of a given toner are capable of being electrostatically charged so that they will stick to the selected areas scanned by the laser light beam in the laser printing process or otherwise exposed in the photocopying process.

The binder resin (also referred to, for purposes of use with toners, as an encapsulant) is used to encapsulate the pigments in the colorant into toner particles. Examples of materials that can be used as binders for toners include polymers, copolymers, polyolefins, other hydrocarbon polymers, or styrene. The colorant may include pigments such as carbon black, color or colorless dyes, covert pigments (e.g., UV and/or IR pigments), etc. External surface additives, which are generally added in small amounts, can include silica, titanium dioxide, zinc stearate, etc.

Magnetic particles (e.g., magnetite) can be used to evenly distribute the toner particles on the developer roller. As known to those skilled in the art, magnetite particles can act like magnetic "fingers" that enable charged toner particles to stick onto the fingers and cause the toner particles to be evenly distributed on a pickup transfer roller. Filler material which provides lubrication properties to the toner and melt upon heating and fusing to bond the toner particles to the printed media (paper or transparent foils). The filler materials can, for example, be materials like acrylic copolymers that are highly cross linked and have relatively low melting point (below 100 degrees C.). Examples of filler materials include polypropylene, polyethylene, etc., in micro-crystalline form (micro-ground to submicron sizes). Filler material provides lubrication properties and can help reduce agglomeration of the toner particles. In addition, filler material can melt upon fusing to help bond the toner material to the medium to which it is being printed.

Because toners can be used for laser printing, copying, xerographic printing, the availability of toners made using covert pigments (referred to herein as "covert toners") has the potential to add covert printing capability to laser printing. Further information about covert toners can be found in U.S. Pat. No. 5,714,291, entitled "System for Authenticating Printed or Reproduced Documents," which is hereby incorporated by reference.

We have found, however, that identification documents printed using at least some typical covert pigments (e.g., UV pigments) do not perform well under some types of test conditions, such as some testing conditions in the American National Standards Institute (ANSI) National Committee for International Technology Standards (NCITS) 322 document for Card Durability Test Methods Working Paper (available from the American National Standards Institute in Washington, D.C.) For example, identification documents printed using at least some covert pigments fail to perform well under all of the NCITS 322 testing extremes, especially tests such as Surface Abrasion, Image Abrasion, Temperature and Humidity tests (including Temperature and Humidity induced dye migration), Ultraviolet (UV) Light Exposure Stability, Daylight Image Stability (Xenon Arc), and Laundry Test. NCITS 322 is designed to represent extremes of real conditions to which the printed documents may be subjected. Because many large government programs (LGPs) such as issuers of driver's licenses require NCITS 322 compliance, these types of performance failures of covert pigments need to be reduced or eliminated if covert toners are to be used successfully in printing of these types of identification documents.

In particular, we have found several performance problems with some covert pigments, covert inks, and covert toners (toners containing so-called "covert" pigments —pigments that, when mixed into the toner, produce a printed image that is visible only under certain conditions, such as under ultraviolet (UV) and/or infrared (IR) illumination).

One aspect of the invention is a covert material for printing onto a printing medium. This covert material comprises a covert pigment, and a binder encapsulating the covert pigment into a particle. The binder comprises at least one of cellulose acetate butyrate (CAB), butyral vinyl acetate, acetyl butyrate, and acetate butyrate. In an alternative embodiment, the binder comprises at least one of polyester, polyolefin, acetyl butyrate, acetate butyrate, polystyrene copolymer, and polystyrene-polyvinylpyridine.

The covert material may further comprise a colorant, a surface additive, and a magnetic particle, and may be part of a toner or ink. In a particular toner embodiment, the toner includes the covert material and a sub-component material comprising at least one of cellulose acetate butyrate (CAB), butyral vinyl acetate, acetyl butyrate, and acetate butyrate. In this embodiment, the binder for the covert material and the subcomponent of the toner comprise substantially the same material.

The covert material may be constructed and arranged to be printed using a printer having a predetermined resolution, where the particle has a size that is substantially the same as the size of a single pixel or dot printed using the predetermined resolution.

Another aspect of the invention is a method to prepare a covert material for printing comprising providing a covert pigment, and encapsulating the covert pigment into a binder to form a particle, where the binder comprises at least one of cellulose acetate butyrate (CAB), butyral vinyl acetate, acetyl butyrate, and acetate butyrate. The covert material is then mixed into a toner or an ink. In an alternative embodiment, the binder comprises at least one of polyester, polyolefin, acetyl butyrate, acetate butyrate, polystyrene copolymer, and polystyrene-polyvinylpyridine.

Another aspect of the invention is a method to prepare a covert material for printing. This method comprises mixing a binder with a first solvent to form a binder-solvent mixture, the binder comprising at least one of cellulose acetate butyrate (CAB), butyral vinyl acetate, acetyl butyrate, and acetate butyrate; encapsulating a covert pigment with the binder-solvent mixture; grinding the encapsulated covert pigment into a particle having a predetermined size; and mixing the particle into a second solvent.

The covert material is used to make an identification card. In one example of such a card, the card comprises a core layer, and a covert indicium printed onto the core layer using a covert printing medium. The covert printing medium comprises a covert pigment and a binder as summarized above. Alternatively, the covert indicium is printed on a substantially transparent layer affixed to the core layer.

Additional aspects of the invention are a method and structure for improving the stability of a covert pigment on printed object. The method comprises applying an undercoat of varnish to a substrate; and printing a covert pigment onto the undercoat. The undercoat forms an oxygen and/or water barrier between the covert pigment and the substrate. An overcoat using the same or different material as the undercoat may be used to encapsulate the covert pigment. This is particularly advantageous in documents that have a porous substrate and use covert inks that are susceptible to degradation when exposed to oxygen or water. A document structure includes a substrate, an undercoat and a covert pigment printed on the undercoat. Examples include a document with a substrate preprinted with an undercoat, fixed or variable information (e.g., personal information of the bearer) printed on the undercoat, and an overcoat of varnish, lacquer or overlaminate.

DETAILED DESCRIPTION

In one example, we tested a typical "UV Green" toner (fluoresces a greenish yellow color when illuminated by UV light) (from Angstrom Technologies of Erlanger, Ky.), where the toner uses the Angstrom SC-19 organic yellow/green pigment. We took the SC-19 pigment as provided by Angstrom and mixed it with a polystyrene binder and made into a formulation that could be screen or slot coated/printed onto documents to form desired indicia (to simulate the appearance of an indicia printed via laser printing). We then screen coated the SC-19/binder formulation to print various indicia onto identification cards, such as TESLIN-core identification cards, PVC identification cards, and polycarbonate identification cards. We then tested the identification cards printed with the SC-19 formulation under various extremes of temperature, humidity, "severe service" (e.g., abrasion), etc., as specified by NCITS 322. We noted the following test results for the SC-19 formulation:
  good light fastness performance (resistance to degradation caused by prolonged exposure to visible light)
  comparatively poor heat//humidity performance In another example, we tested a typical "UV Blue" toner (fluoresces a blue color when illuminated by UV light) from Angstrom Technologies, where the toner uses the Angstrom SC-5 pigment. As provided by Angstrom, the UV Blue toner was mixed with a polyester binder and made into a formulation that could be screen or slot coated/printed onto documents to form desired indicia (to simulate the appearance of an indicia printed via laser printing). We then screen coated the SC-5/binder formulation to print various indicia onto identification cards, such as TESLIN-core identification cards, PVC identification cards, and polycarbonate identification cards. We then tested the identification cards printed with the SC-5 formulation under various extremes of temperature, humidity, "severe service" (e.g., abrasion), etc., as specified by NCITS 322. We noted the following test results for the SC-5 formulation:
  good performance under "severe service"
  good performance under dry heat conditions
  good performance under a wet/hot dye diffusion test
  stable under heat and humidity aging test
  comparatively poor light fastness Many identification documents, such as driver's licenses, can be subject to harsh conditions that may require that an identification document printed with a covert toner meet all of the above requirements simultaneously (and not just some of them). Thus, we have been developing modified toner formulations that can provide improved performance over presently available covert toners. We have found that the behavior of many covert toners is strongly affected by factors such as the binders used in the formulation of such toners and also the size of the encapsulated pigment/colorant particles.

We have found that at least some types of covert pigments, such as the SC-5 pigment and the SC-19 pigment, can be stable by themselves, but in combination with certain types of encapsulants, such as polystyrene, the pigment in the resultant toner becomes unstable. We believe that this instability can have one or more causes, such as the process of encapsulating the SC-19 pigment and/or the styrene encapsulant itself. We have developed solution that can help eliminate or reduce one or more of the causes of instability.

It should be understood that, for the following example embodiments, although many of them are described with respect to a single color or type of covert pigment, viewable using a specific type of light (UV light), from a specific manufacturer (e.g., UV-Green Angstrom SC-19 pigment), the invention is not so limited. As those skilled in the art will appreciate, we have found that various embodiments of our invention have applicability to many other colors of covert pigment, available from many different manufacturers (e.g., Angstrom, the CARTAX line of pigments available from Clariant Corporation of North Caroline, various covert printing materials available from printer companies such as, Hewlett Packard, Xerox, Canon, etc.), and using different types of covert technologies (e.g., infrared, thermachromic, etc.). Further, although at least some embodiments of the invention are described in connection with printing onto identification documents, the invention is not, of course, so limited. The invention has applicability to the printing of a covert indicium onto virtually any article of manufacture.

In one embodiment, the invention includes a covert material for printing onto a printing medium comprising a covert pigment, and a binder encapsulating the covert pigment into a particle, where the binder comprises at least one of polyester, polyolefin, acetyl butyrate, acetate butyrate, polystyrene copolymer, and polystyrene-polyvinylpyridine. The covert material can further comprise at least one of a colorant, a surface additive, and a magnetic particle. The covert material can be part of a toner. In at least some embodiments, the particle can have many different sizes, including sizes greater than 1 micron, greater than 5 microns, and greater than 20 microns. In one embodiment, the covert printing material is constructed and arranged to be printed using a printer having a predetermined resolution, wherein the particle has a size that is substantially the same as the size of a single pixel or dot printed using the predetermined resolution. The covert material can be constructed and arranged to satisfy a predetermined number of the NCITS 322 tests.

In a further aspect of the invention, the invention includes a method to prepare a covert material for printing, comprising providing a covert pigment, and encapsulating the covert pigment into binder to form a particle, where the binder comprises at least one of polyester, polyolefin, acetyl butyrate, acetate butyrate, polystyrene copolymer, and polystyrene-polyvinylpyridine. We can mix the covert material into a toner. We also can magnetize the covert material so that the covert material can be printed using a laser printer.

In another aspect of the invention, the invention includes an identification card, comprising a core layer and a covert indicium printed onto the core layer, the covert indicium comprising a covert pigment a binder encapsulating the covert pigment into a particle, where the binder comprises at least one of polyester, polyolefin, acetyl butyrate, acetate butyrate, polystyrene copolymer, and polystyrene-polyvinylpyridine.

In still another embodiment, the invention includes an identification card, comprising a core layer, a substantially transparent layer affixed to the core layer, and a covert indicium printed onto the substantially transparent layer, the covert indicium comprising a covert pigment a binder encapsulating the covert pigment into a particle, where the binder comprises at least one of polyester, polyolefin, acetyl butyrate, acetate butyrate, polystyrene copolymer, and polystyrene-polyvinylpyridine.

In a further embodiment, we provide a covert material for printing onto a printing medium comprising a covert pigment and a binder encapsulating the covert pigment into a particle, where the binder comprises at least one of cellulose acetate butyrate (CAB), butyral vinyl acetate, acetyl butyrate, and acetate butyrate.

The covert material can comprise additional components, such as ethyl acetate and/or n-propyl acetate. In one embodiment, the covert pigment comprises about 0.5-5% of the covert material. In one embodiment, the binder comprises about 5-30% of the covert material. In one advantageous embodiment, the covert pigment comprises at least 2% of the covert material and the binder comprises about 20-25% of the covert material.

In a further embodiment, we provide a method to prepare a covert material for printing, comprising providing a covert pigment, and encapsulating the covert pigment into binder to form a particle, where the binder comprises at least one of cellulose acetate butyrate (CAB), butyral vinyl acetate, acetyl butyrate, and acetate butyrate. The covert material can be mixed into a toner or an ink.

In a still another embodiment, we provide a method to prepare a covert material for printing, comprising:

mixing a binder with a first solvent to form a binder-solvent mixture, the binder comprising at least one of cellulose acetate butyrate (CAB), butyral vinyl acetate, acetyl butyrate, and acetate butyrate;

encapsulating a covert pigment with the binder-solvent mixture;

grinding the encapsulated covert pigment into a particle having a predetermined size; and mixing the particle into a second solvent.

In yet another embodiment, we provide an identification card comprising a core layer; and a covert indicium printed onto the core layer using a covert printing medium, the covert printing medium comprising a covert pigment and a binder, where the binder comprises at least one of cellulose acetate butyrate (CAB), butyral vinyl acetate, acetyl butyrate, and acetate butyrate.

In an additional embodiment, we provide an identification card, comprising a core layer, a substantially transparent layer affixed to the core layer, and a covert indicium printed onto the substantially transparent layer, the covert indicium comprising a covert pigment and binder encapsulating the covert pigment into a particle, where the binder comprises at least one of cellulose acetate butyrate (CAB), butyral vinyl acetate, acetyl butyrate, and acetate butyrate.

The foregoing and other features and advantages of the present invention will be even more readily apparent from the following Example Embodiments, which proceeds with reference to the accompanying claims. Those skilled in the art will appreciate that although a specific brand or product number for a given component (e.g., a binder, a pigment, etc.) may be indicated, the invention is not so limited. Chemically and/or functionally equivalent components (e.g., covert pigments from other manufacturers, chemically similar binders, etc.) are, of course, intended to be included in the invention.

First Example Embodiment

In one embodiment, we have improved the performance of the above-identified "UV Green" (using Angstrom SC-19 pigment) by using SC-19 the pigment with a specific encapsulant different from the typical styrene encapsulant normally provided with the SC-19 pigment when it is mixed into a "UV-Green" toner. For example, we have found that using encapsulants such as polyesters and/or polyolefins helps to improve aspects of the environmental performance of the "UV-Green" when it is printed onto cards. We have found that use of this binder results in an encapsulated UV pigment particle having better stability under at least the following NCIT 322-type conditions:

good performance under "severe service"
good performance under dry heat conditions
good performance under a wet/hot dye diffusion test
stable under heat and humidity aging test
good light fastness Second Example Embodiment In one embodiment, we have improved the performance of the above-identified "UV Green" (using Angstrom SC-19 pigment) by using the pigment with a styrene carrier toner but where the encapsulant for the covert pigment is an encapsulant other than polystyrene. We have found that use of this combination results in an encapsulated UV pigment particle having better stability under at least the following NCIT 322-type conditions:

good performance under "severe service"
good performance under dry heat conditions
good performance under a wet/hot dye diffusion test
stable under heat and humidity aging test
good light fastness Third Example Embodiment In this embodiment, we have improved the performance of the above-identified "UV Green" (Angstrom SC-19) by maximizing the relative size of the encapsulated covert pigment particle as compared to its normally provided size. One known method of making covert pigment particles (specifically, UV pigment particles) for toners is detailed in the aforementioned and incorporated-by-reference U.S. Pat. No. 5,714,291. Briefly, as this patent notes, the UV pigment particles are formed as follows: UV compounds of submicron size are suspended in an encapsulation solution and then precipitated under cool ambient conditions. The encapsulant solidifies and encapsulates the UV compounds to form UV sensitive particles of submicron size that can then be sieved and/or ground or milled to ensure submicron size, a size that preferably (according to this patent) achieves a resultant UV particle size preferably less than 0.5 microns in dimension.

Although we understand that such small size of the resultant UV particle may help in preparation of the resultant toner, we have found that such small particle size does not help to stabilize the UV pigment (or other covert pigment). This lack of stability may occur because, when particle size is smaller, a greater percentage of the particle is "exposed" through the particle's surface area (e.g., to water, humidity, light, etc.) during use. This can be easily understood by assuming that the particle is a substantially solid sphere (although, of course, it need not be completely solid nor need it have a spherical shape). As the size of any sphere increases, the surface area of the sphere represents a smaller and smaller percentage of the total volume of the sphere. Thus, a smaller percentage of the total pigment contained in a spherical particle is "exposed" as surface area.

We have found reducing the exposure of the UV pigment to certain environmental factors, such as water, can help to improve the durability and resistance of the UV pigment (and formulations, such as toners and coatings, made with it), and have found that the larger the relative size of the pigment particle, the more stable the resultant toner will be to outside influences such as water, possibly because less surface area of the particle is exposed. The maximization of size could be accomplished in many different ways, of course, such as either via a pre or post grind process during the manufacture of the encapsulated pigment particle. The maximize size of the improved UV particle (and resultant toner) that we propose can be considerably larger than the 0.5 micron size suggested and preferred by the U.S. Pat. No. 5,714,291 patent. The upper limit on size of UV particle would be limited only by the resolution of the printer.

For example, consider a printer with a resolution of 300 dots per inch (DPI). The "dot size" with such a printer is about 84.67 microns. The size of the encapsulated covert particle containing covert pigment could approach this size of up to about 84.67 microns without interfering with the printing of indicia and without causing an overly uneven distribution of encapsulated covert particles. This is especially true where the area being printed is relatively small (e.g., smaller than 1" by 2"). For a 600 DPI printer, the size of the encapsulated particle containing covert pigment could similarly approach the "dot size" of 42.66 microns, and for a 1200 DPI printer, the size of the encapsulated particle containing covert pigment could similarly approach the "dot size" of 21.17 microns, 4000 dpi -6.35 microns, etc.

Fourth Example Embodiment

In this embodiment, we have improved the performance of the above-identified "UV Green" toner (using Angstrom SC-19 pigment) by using the covert pigment in a formulation that includes at least one of a polyester and a polyolefin where the encapsulant is also at least one of a polyester and a polyolefin. In one preferred embodiment, both the toner composition and the encapsulant comprise the same material. We have found that use of this combination results in an encapsulated UV pigment particle having better stability under at least the following NCIT 322-type conditions:
  good performance under "severe service"
  good performance under dry heat conditions
  good performance under a wet/hot dye diffusion test
  stable under heat and humidity aging test
  good light fastness Fifth Example Embodiment In this embodiment, we have improved the performance of covert toners such as the above-identified "UV Green toner" by using the pigment with a binder that includes either acetate butyrate or acetyl butyrate. We have found that use of either of these binders results in encapsulated UV pigment particle having better stability under at least the following NCIT 322-type conditions:
  good performance under "severe service"
  good performance under dry heat conditions
  good performance under a wet/hot dye diffusion test
  stable under heat and humidity aging test
  good light fastness Sixth Example Embodiment In still another embodiment, we have improved the performance of the above identified "UV Green" toner (using SC-19 pigment) by using the SC-19 pigment with a polystyrene copolymer binder/encapsulant instead of a polystyrene binder/encapsulant. We have found that use of this combination results in an encapsulated UV pigment particle having better stability under at least the following NCIT 322-type conditions:
  good performance under "severe service"
  good performance under dry heat conditions
  good performance under a wet/hot dye diffusion test
  stable under heat and humidity aging test
  good light fastness Seventh Example Embodiment In a further embodiment, we have improved the performance of the above identified "UV Green" toner (using SC-19 pigment) by using the SC-19 pigment with a polystyrene-polyvinylpyridine copolymer binder/encapsulant instead of a polystyrene binder/encapsulant. We have found that use of this combination results in an encapsulated UV pigment particle having better stability under at least the following NCIT 322-type conditions:
  good performance under "severe service"
  good performance under dry heat conditions
  good performance under a wet/hot dye diffusion test
  stable under heat and humidity aging test
  good light fastness Eighth Example Embodiment In a further embodiment, we have improved the performance of the above identified "UV Green" toner (using SC-19 pigment) by using the SC-19 pigment with a cellulose acetate butyrate (CAB) binder. We have found that use of this combination results in an encapsulated UV pigment particle having better stability under at least the following NCIT 322-type conditions:
  good performance under "severe service"
  good performance under dry heat conditions
  good performance under a wet/hot dye diffusion test
  stable under heat and humidity aging test
  good light fastness For example, as shown in Table 1, we formulated a printing medium containing about 2.4% SC-19 pigment, 30.4% ethyl acetate, 45.6% n-propyl acetate, and 21.8% cellulose acetate butyrate (CAB). In this embodiment, we used CAB 381-0.5, which is available from Eastman Chemical Company of Kingsport, Tenn. Cellulose Acetate Butyrate (CAB 381-0.5) is a cellulose ester with medium butyryl content and low viscosity, and those skilled in the art will appreciate that other equivalent cellulose esters would, of course, be usable in this embodiment.

TABLE 1

| SC-19 with CAB | | |
|---|---|---|
| Testing Material | Cellulose Acetate Butyrate | |
| Name | UV-ink | |
| Card type | | |
| Substrate | | |
| Printing Method | | |
| Book# (refers to inventor notebook page) | DIDS014-28B | |
| | | % |
| Final formulation | Ethyl Acetate | 30.40 |
| | n-Propyl Acetate | 45.60 |
| | CAB381-0.5 | 21.60 |
| | SC-19 | 2.40 |

Ninth Example Embodiment

In further embodiments, we evaluated various covert inks, including ultraviolet inks, with various binders to test the stability of the covert inks, when subjected to environmental and other tests, including accelerated aging, heat, moisture, and Xenon arc light exposure. These formulations are detailed in Tables 2 through 5.

Table 2 shows a first printing medium formulation that we tested using a CAB type of binder and a covert pigment. Table 2 also illustrates our procedure for making this printing medium formulation. In this example, the CAB binder was CAB 500-5 from Eastman Chemical, and the covert pigment was CARTAX CDXP organic fluorescent (UV fluorescent) pigment from Clariant International, Inc. of Switzerland. CAB 500-5 Cellulose Acetate Butyrate (CAB-500-5) is a cellulose ester with high butyryl content, low hydroxyl content and medium ASTM(A) viscosity, and those skilled in the art will appreciate that other equivalent cellulose esters would, of course, be usable in this embodiment. we also expect that our results would have applicability with many different types of covert pigments besides the CARTAX pigment.

TABLE 2

| CARTAX UV pigment with CAB 500-5 Binder - first version | | | | | | | |
|---|---|---|---|---|---|---|---|
| | Testing Material | Cellulose Acetate Butyrate | | | | | |
| | Name | UV-ink | | | | | |
| | Card type | | | | | | |
| | Substrate | | | | | | |
| | Printing Method | | | | | | |
| | Book# | DIDS014-27A | | Total | | | |
| | | Parts | % | Procedure | | | |
| | Final formulation | Ethyl Acetate | | 30.40 | | | |
| | | n-Propyl Acetate | | 45.60 | | | |
| | | CAB500-5 | | 21.60 | | | |
| | | Cartax CDXP | | 2.40 | | | |
| Step1 | Solvent extender | | 950.00 | | | | |
| | | Ethyl Acetate | 380.00 | 40.00 | | | |
| | | n-Propyl Acetate | 570.00 | 60.00 | | | |
| Step2 | Polymer solution | | 900.00 | | | | |
| | | CAB500-5 | 270.00 | 30.00 | | | |
| | | Solvent Ext. | 630.00 | 70.00 | | | |
| | | | | | Gentle mixing for 18 hrs. | | |
| Step3 | Cartax mixture | | 100.00 | | | | |
| | | Cartax | 30.00 | 30.00 | | | |
| | | Polymer solution | 50.00 | 50.00 | | | |
| | | Extender | 20.00 | 20.00 | | | |
| | | | | | Grinding for 18 hrs. | | |
| Step4 | Ink mixture | | | | | | Check |
| | | Cartax mixture | 100.00 | 8.00 | | Cartax CDXP | 2.4 |
| | | Polymer solution | 850.00 | 68.00 | | Binder | 21.6 |
| | | Extender | 300.00 | 24.00 | Mixing for 1/2 hr. | Solvents | 76 |

Table 3 shows a second printing medium formulation that we tested using a CAB type of binder and a covert pigment. Table 3 also illustrates our procedure for making this printing medium formulation. In this example, the CAB binder was also CAB 500-5 from Eastman Chemical, and the covert pigment was CARTAX CDXP organic fluorescent (UV fluorescent) pigment from Clariant International, Inc. of Switzerland. The printing medium of Table 3 differs from that of Table 2, however, in that the relative percentages of binder, covert pigment, and solvents are different.

TABLE 3

CARTAX UV pigment with CAB 500-5 Binder - second version

| | | | Parts | % | Total Procedure | | |
|---|---|---|---|---|---|---|---|
| | Testing Material Name | Cellulose Acetate Butyrate | | | | | |
| | Card type | UV-ink | | | | | |
| | Substrate | | | | | | |
| | Printing Method | | | | | | |
| | Book# | DIDS014-27A | | | | | |
| | Final formulation | Ethyl Acetate | | 35.32 | | | |
| | | n-Propyl Acetate | | 52.98 | | | |
| | | CAB500-5 | | 10.50 | | | |
| | | Cartax CDXP | | 1.20 | | | |
| Step1 | Solvent extender | | 1135.00 | | | | |
| | | Ethyl Acetate | 454.00 | 40.00 | | | |
| | | n-Propyl Acetate | 681.00 | 60.00 | | | |
| Step2 | Polymer solution | | 900.00 | | | | |
| | | CAB500-5 | 135.00 | 15.00 | | | |
| | | Solvent Ext. | 765.00 | 85.00 | | | |
| | | | | | Gentle mixing for 18 hrs. | | |
| Step3 | Cartax mixture | | 100.00 | | | | |
| | | Cartax | 30.00 | 30.00 | | | |
| | | Polymer solution | 50.00 | 50.00 | | | |
| | | Extender | 20.00 | 20.00 | | | |
| | | | | | Grinding for 18 hrs. | | |
| Step4 | Ink mixture | | | | | | Check |
| | | Cartax mixture | 50.00 | 4.00 | | Cartax CDXP | 1.2 |
| | | Polymer solution | 850.00 | 68.00 | | Binder | 10.5 |
| | | Extender | 350.00 | 28.00 | Mixing for 1/2 hr. | Solvents | 88.3 |

Table 4 shows a third printing medium formulation that we tested using a CAB type of binder and a covert pigment. Table 4 also illustrates our procedure for making this printing medium formulation. In this example, the CAB binder was CAB 381-0.5 from Eastman Chemical, and the covert pigment was CARTAX CDXP organic fluorescent (UV fluorescent) pigment from Clariant International, Inc. of Switzerland. Cellulose Acetate Butyrate (CAB 381-0.5) is a cellulose ester with medium butyryl content and low viscosity, and those skilled in the art will appreciate that other equivalent cellulose esters would, of course, be usable in this embodiment. We also expect that our results would have applicability with many different types of covert pigments besides the CARTAX pigment.

TABLE 4

CARTAX UV pigment with CAB 381-0.5 Binder - first version

| | | | Parts | % | Total Procedure |
|---|---|---|---|---|---|
| | Testing Material Name | Cellulose Acetate Butyrate | | | |
| | Card type | UV-ink | | | |
| | Substrate | | | | |
| | Printing Method | | | | |
| | Book# | DIDS014-27B | | | |
| | Final formulation | Ethyl Acetate | C | 30.40 | |
| | | n-Propyl Acetate | | 45.60 | |
| | | CAB381-0.5 | | 21.60 | |
| | | Cartax CDXP | | 2.40 | |
| Step1 | Solvent extender | | 950.00 | | |
| | | Ethyl Acetate | 380.00 | 40.00 | |
| | | n-Propyl Acetate | 570.00 | 60.00 | |
| Step2 | Polymer solution | | 900.00 | | |

TABLE 4-continued

| | | CARTAX UV pigment with CAB 381-0.5 Binder - first version | | | | | |
|---|---|---|---|---|---|---|---|
| | | CAB381-0.5 | 270.00 | 30.00 | | | |
| | | Solvent Ext. | 630.00 | 70.00 | | | |
| | | | | | Gentle mixing for 18 hrs. | | |
| Step3 | Cartax mixture | | 100.00 | | | | |
| | | Cartax | 30.00 | 30.00 | | | |
| | | Polymer solution | 50.00 | 50.00 | | | |
| | | Extender | 20.00 | 20.00 | | | |
| | | | | | Grinding for 18 hrs. | | |
| Step4 | Ink mixture | | | | | | Check |
| | | Cartax mixture | 100.00 | 8.00 | | Cartax CDXP | 2.4 |
| | | Polymer solution | 850.00 | 68.00 | | Binder | 21.6 |
| | | Extender | 300.00 | 24.00 | Mixing for 1/2 hr. | Solvents | 76 |

Table 5 shows a fourth printing medium formulation that we tested using a CAB type of binder and a covert pigment. Table 5 also illustrates our procedure for making this printing medium formulation. In this example, the CAB binder was also CAB 381-0.5 from Eastman Chemical, and the covert pigment was CARTAX CDXP organic fluorescent (UV fluorescent) pigment from Clariant International, Inc. of Switzerland. The printing medium of Table 5 differs from that of Table 4, however, in that the relative percentages of binder, covert pigment, and solvents are different.

TABLE 5

| | | CARTAX UV pigment with CAB 381-0.5 Binder - second version | | | | | |
|---|---|---|---|---|---|---|---|
| | | Testing Material Name | | Cellulose Acetate Butyrate | | | |
| | | Card type Substrate | | UV-ink | | | |
| | | Printing Method | | | | | |
| | | Book# | | DIDS014-27C | | | |
| | | | | Parts | % | | Total Procedure |
| | Final formulation | Ethyl Acetate | | | 30.90 | | |
| | | n-Propyl Acetate | | | 46.35 | | |
| | | CAB381-0.5 | | | 22.00 | | |
| | | Cartax CDXP | | | 0.76 | | |
| Step1 | Solvent extender | | 950.00 | | | | |
| | | Ethyl Acetate | 380.00 | 40.00 | | | |
| | | n-Propyl Acetate | 570.00 | 60.00 | | | |
| Step2 | Polymer solution | | 900.00 | | | | |
| | | CAB381-0.5 | 270.00 | 30.00 | | | |
| | | Solvent Ext. | 630.00 | 70.00 | | | |
| | | | | | Gentle mixing for 18 hrs. | | |
| Step3 | Cartax mixture | | 100.00 | | | | |
| | | Cartax | 30.00 | 30.00 | | | |
| | | Polymer solution | 50.00 | 50.00 | | | |
| | | Extender | 20.00 | 20.00 | | | |
| | | | | | Grinding for 18 hrs. | | |
| Step4 | Ink mixture | | | | | | Check |
| | | Cartax mixture | 30.00 | 2.54 | | Cartax CDXP | 0.762712 |
| | | Polymer solution | 850.00 | 72.03 | | Binder | 21.99153 |
| | | Extender | 300.00 | 25.42 | Mixing for 1/2 hr. | Solvents | 77.24576 |

Table 6 shows a fifth printing medium formulation that we tested using a CAB type of binder and a covert pigment. Table 6 also illustrates our procedure for making this printing medium formulation. In this example, the CAB binder was CAB 551-0.01 from Eastman Chemical, and the covert pigment was CARTAX CDXP organic fluorescent (UV fluorescent) pigment from Clariant International, Inc. of Switzerland. Cellulose Acetate Butyrate (CAB-55 1-0.01) is a cellulose ester with high butyryl content and low ASTM(A) viscosity. CAB-551-0.01 is soluble in styrene and methyl methacrylate monomers and will tolerate more aliphatic and aromatic hydrocarbon diluent than higher viscosity materials. Those skilled in the art will appreciate that other equivalent cellulose esters would, of course, be usable in this embodiment. We also expect that our results would have applicability with many different types of covert pigments besides the CARTAX pigment.

document that was laminated front and back. We tried the following two different types of adhesives:
TXP-0/FG Lot # 700146, Roll # 804875-007-2;
TXP-0/KRTY Lot # 700368, Roll # 808098-008-1
The TESLIN was white TESLIN and contained no pre-printed or other printed information thereon. In one embodiment, the TESLIN included a release coating (SPID) on 100% of its border. The following results were noted for the testing of the printing media of Tables 2-6:
General Observations
We found no performance distinctions with the performance of each ink due to the adhesive types (FG or KRTY). In addition, we found that the inks' adhesion performance to the TESLIN or laminate was not influence by the adhesive type (FG or KRTY) on the laminate. We did find that using lower concentrations of the covert pigment (such as illustrated in Table 5) presented a disadvantage in the brightness of the printing, both before and after the environmental testing

TABLE 6

CARTAX UV pigment with CAB 551-0.01 Binder

| | | | Parts | % | Total Procedure | | |
|---|---|---|---|---|---|---|---|
| | Testing Material | Cellulose Acetate Butyrate | | | | | |
| | Name | UV-ink | | | | | |
| | Card type | | | | | | |
| | Substrate | | | | | | |
| | Printing Method | | | | | | |
| | Book# | DIDS014-27D | | | | | |
| | Final formulation | Ethyl Acetate | | 30.40 | | | |
| | | n-Propyl Acetate | | 45.60 | | | |
| | | CAB551-.01 | | 21.60 | | | |
| | | Cartax CDXP | | 2.40 | | | |
| Step1 | Solvent extender | | 950.00 | | | | |
| | | Ethyl Acetate | 380.00 | 40.00 | | | |
| | | n-Propyl Acetate | 570.00 | 60.00 | | | |
| Step2 | Polymer solution | | 900.00 | | | | |
| | | CAB551-.01 | 270.00 | 30.00 | | | |
| | | Solvent Ext. | 630.00 | 70.00 | | | |
| | | | | | Gentle mixing for 18 hrs. | | |
| Step3 | Cartax mixture | | 100.00 | | | | |
| | | Cartax | 30.00 | 30.00 | | | |
| | | Polymer solution | 50.00 | 50.00 | | | |
| | | Extender | 20.00 | 20.00 | | | |
| | | | | | Grinding for 18 hrs. | | Check |
| Step4 | Ink mixture | | | | | | |
| | | Cartax mixture | 100.00 | 8.00 | | Cartax CDXP | 2.4 |
| | | Polymer solution | 850.00 | 68.00 | | Binder | 21.6 |
| | | Extender | 300.00 | 24.00 | Mixing for 1/2 hr. | Solvents | 76 |

Testing of Printing Media of Tables 2-6

We tested samples of each of the printing media (also referred to herein as inks) of Tables 2-6 in several ways. In the first testing mode, each ink being tested was printed directly onto an identification document core (e.g., a TESLIN surface). The first set of samples generated had the test inks printed directly on the Teslin material surface where as the second set had the ink printed on the laminate adhesive side. In the second testing mode, we printed the printing media on a laminate adhesive side of a TESLIN-core identification document that was laminated front and back. We tried the described below. We found that high levels of humidity exposure can tend to produce the greatest diminishing effect on the brightness of the ink and on the ink's stability.

During attempts at intrusion, we found in at least some instances that the adhesion of the ink in the identification document structure can sometimes provide the weakest bonds in the structure. For example, it can be easy to separate laminate from the TESLIN by hand at the ink's interface with the laminate. The edge of the identification document (e.g., card edge) can also be vulnerable because of low adhesion of the ink.

Xenon Arc Testing: 1, 4 and 7 Day Exposure

When comparing samples printed on TESLIN versus samples printed on the laminate, we found that there was a consistent increased level of brightness with the inks printed on the Teslin. However, our testing showed that this appeared to be the only time that there was a different level of brightness between the two sets of samples. Another consideration that should be kept in mind is that because our test samples were produced in a lab environment, ink coverage may not be as consistent as it might be in a different printing environment (e.g., a system such as the previously described central issue or over the counter printing system). We have found that ink coverage does play a major effect on the performance of the inks brightness.

Generally, during our testing we found that the level of brightness does decline with increased exposure time of the Xenon Arc. We found that the ink formula (014-27-C) (Table 5) with the lower concentration of the Cartax UV component does display the largest negative change. We found that the two ink formulas that displayed the optimum stability during the Xenon Arc test were the 014-27-A (Tables 2 and 3)and 014-27-D (Table 6) out of the samples tested. This optimum performance of the inks of Tables 2, 3, and 6 occurred both with samples printed onto TESLIN and samples printed onto laminate. These above result occurred with both sets samples; printed on Teslin and laminate.

Hot-Dry/Hot-Wet Conditioning

Hot-Dry conditioning used an oven temperature of 160° F. Hot-Wet Conditioning used oven temperature 160° F. & 100% relativity humidity (Bell Jar).

During the Hot-Dry and Hot-Wet conditioning, we found essentially no discernable difference between the two sets of samples; printed on Teslin or laminate surface with their performance. The same trend of results occurred with both conditioning environments, Hot-Dry and Hot Wet. However, we found that the Hot-Wet samples displayed a considerate increase in loss of brightness. For example, we found that there was approximately 20 to 30% greater decrease in brightness of the Hot-Wet when compared to hot dry samples. The overall loss to the hot-wet samples when compared to control samples (not exposed to any conditioning) is approximately 50 to 55% loss in brightness.

We found the sample 014-27-C (Table C, lowest concentration of covert pigment) did display the greatest impact to its brightness levels. We also found that Samples 014-27-A (Tables 2 and 3)and 014-27-D (Table 6) performed the best and produced the optimum results of these samples tested.

Based on our test results described herein in connection with the testing of the inks of Tables 2-6, we have found that there are certain combinations of covert pigments and cellulose acetate butyrate (CAB) binders that have very good performance under both Xenon Arc testing, Hot-Wet conditioning, and Hot-Dry conditioning. We believe that use of the CAB binder improves the environmental performance of the covert pigments that we used.

Undercoat and/or Overcoat Layers to Protect Covert Printing Layer

Some covert pigments, such as Ultraviolet pigments, can fade in harsh environments, especially, when some of the UV pigments are printed directly or laminated onto a substrate that causes degradation or oxidation of the covert pigment. Similarly, some covert IR pigments, particularly organic IR pigments, also have stability problems. Substrates that are particularly problematic are ones that are porous to oxygen or water, such as TESLIN or paper. Conditions such as 70° C. (120 F) and 100% humidity will cause some UV pigments in invisible ink printing on identification cards to disappear in 24 hours. Because there is about 60% precipitated silica in a TESLIN substrate, it can cause degradation and oxidation of ultraviolet fluorescent pigments. There is a need to stabilize some forms of UV printing on ID cards to ensure that the UV feature remains an effective machine or human readable security feature for authenticating the document. When a varnish is printed under and/or over the UV printing, it encapsulates the security printing, thus stabilizing it from interaction with other components with the card system.

Ultraviolet pigments are the fluorescing mechanism for most invisible security inks. These inks are printed on a surface within the card construct. There are several ways to apply UV security ink onto security document. Examples include offset or lithography printing of the UV ink on a TESLIN core or substrate layer of an identification document structure. TESLIN is a micro porous polyolefin sheet that is used in the identification industry as the printable core for personalization of driver's license and identity card production. This provides a covert security device. As described previously, a standardized test to determine the stability of the card is incubation of cards at hot/humid, hot/dry and xenon arc conditions. Many UV inks in cards show instability when tested at these conditions. To improve the stability of the UV inks in these accelerated test conditions, we propose to encapsulate the ink within two layers of an offset varnish. Testing has shown dramatic improvement when this is done.

Another example, we can print personalized information by laser printer using UV fluorescent toner onto TESLIN. Again, some UV toners are not stable when they directly interact with TESLIN. When we preprint a varnish as an underlay to seal the TESLIN surface, then print UV toner onto varnish, it greatly improves the stability of the UV toner.

The undercoat serves to forms an oxygen and/or water barrier between the covert pigment and the substrate. The undercoat may comprises a resin used to formulate inks for offset or lithography printing. Examples of the undercoat/overcoat include an alkyd resin, and phenolic-modified rosin resin. One particular commercial product name is M4379 offset over print varnish from Wikoff Color Corp. We have used offset printing to print the undercoat and overcoat, with the covert pigment printing in between. In one method of offset printing of the over and undercoat, we used a 50% screen, and in another a solid block. The solid block provides more complete encapsulation of the covert printing.

As explained above, an undercoat may be used to improve the stability of a covert pigment printed onto the undercoat, which itself is printed onto a substrate layer. An overcoat may be used to further protect the covert pigment. In one embodiment, the overcoat comprises a lacquer printed over the covert pigment. For example, in one embodiment of creating ID cards, the undercoat is pre-printed on the substrate, the covert pigment is used to print fixed or variable covert information on the undercoat, and an overlacquer is printed on the covert information as the overcoat. The lacquer may comprises a varnish, such as the resin formulation described above. One example of the lacquer is an acrylic latex. Alternatively, the overcoat may comprises an overlaminate that is laminated over the printed information.

This overcoat/undercoat encapsulation method and structure may be used to create permanent or temporary ID documents using an over the counter or central issue process. It can be applied printing stages of the document creation process, where the document is created by printing variable and/or fixed information and the under and overcoat layers using one or more of the following printing technologies: Indigo (variable offset), ink jet, toner based printing, laser printing, thermal transfer (such as D2T2), etc.

Concluding Remarks

Having described and illustrated the principles of the technology with reference to specific implementations, it will be recognized that the technology can be implemented in many other, different, forms, and in many different environments. The technology disclosed herein can be used in combination with other technologies. Also, instead of ID documents, the inventive techniques can be employed with virtually any article of manufacture, including but not limited to product tags, product packaging, labels, business cards, bags, charts, smart cards, maps, labels, etc., etc. The term ID document is broadly defined herein to include these tags, maps, labels, packaging, cards, etc.

Moreover, our techniques are applicable to printing information using covert pigments onto non-ID documents, e.g., such as printing or forming covert images on physical objects, holograms, etc., etc. Further, instead of ID documents, the inventive techniques can be employed with product tags, product packaging, business cards, bags, charts, maps, labels, etc., etc., particularly those items including providing a non-visible indicia, such as an image information on an overlaminate structure. It is contemplated that aspects of the invention may have applicability for articles and devices such as compact disks, consumer products, drugs and pharmaceutical products and packaging, knobs, keyboards, electronic components, decorative or ornamental articles, promotional items, currency, bank notes, checks, etc., or any other suitable items or articles that may record information, images, and/or other data, which may be associated with a function and/or an object or other entity to be identified.

It should be understood that while our some of our detailed embodiments described herein use UV pigments, inks and/or dyes by way of example, the present invention is not so limited. Our inventive techniques and methods will improve the environmental performance infrared and other fluorescing images as well. Moreover, our inventive techniques are useful for the printing of covert images using many different printing techniques, including but not limited to, dye diffusion, mass-transfer, laser xerography, ink jet, wax transfer, variable dot transfer, screen printing, slot printing, screen coating, slot coating, offset, lithography, gravure, and other printing methods by which a covert image can be formed.

To provide a comprehensive disclosure without unduly lengthening the specification, applicants hereby incorporate by reference each of the U.S. patent documents referenced herein. The technology and solutions disclosed herein have made use of elements and techniques known from the cited documents. Other elements and techniques from the cited documents can similarly be combined to yield further implementations within the scope of the present invention.

Thus, the exemplary embodiments are only selected samples of the solutions available by combining the teachings referenced above. The other solutions necessarily are not exhaustively described herein, but are fairly within the understanding of an artisan given the foregoing disclosure and familiarity with the cited art. The particular combinations of elements and features in the above-detailed embodiments are exemplary only; the interchanging and substitution of these teachings with other teachings in this and the incorporated-by-reference patent documents are also expressly contemplated.

In describing the embodiments of the invention, specific terminology is used for the sake of clarity. However, the invention is not limited to the specific terms so selected, and each specific term at least includes all technical and functional equivalents that operate in a similar manner to accomplish a similar purpose.

What is claimed is:

1. A covert material for printing onto a printing medium comprising:
   a covert pigment, the covert pigment viewable using a specific wavelength of light; and
   a binder encapsulating the covert pigment to form an encapsulated covert pigment particle, where the binder comprises at least one of cellulose acetate butyrate (CAB), butyral vinyl acetate, acetyl butyrate, and acetate butyrate, further comprising a solvent extender solution.

2. The covert material of claim 1, further comprising at least one of the following components: a colorant, a surface additive, and a magnetic particle.

3. The covert material of claim 1, wherein the covert material is a component of at least one of an ink and a toner.

4. The covert material of claim 3, wherein the toner itself further comprises a first sub-component, the first subcomponent comprising at least one of cellulose acetate butyrate (CAB), butyral vinyl acetate, acetyl butyrate, and acetate butyrate.

5. The covert material of claim 4, wherein the binder comprises substantially the same material as the first subcomponent.

6. The covert material of claim 1, wherein the solvent extender solution comprises ethyl acetate.

7. The covert material of claim 6, wherein the ethyl acetate comprises about 30-50 % of the solvent extender.

8. The covert material of claim 1, wherein the solvent extender solution further comprises n-propyl acetate.

9. The covert material of claim 8, wherein the n-propyl acetate further comprises about 50-70% of the solvent extender.

10. The covert material of claim 1 wherein the particle has a size greater than 1 micron.

11. The covert material of claim 1 wherein the particle has a size greater than 5 microns.

12. The covert material of claim 1 wherein the particle has a size greater than 20 microns.

13. The covert material of claim 1, wherein the covert printing material is constructed and arranged to be printed using a printer having a predetermined resolution, wherein the particle has a size that is substantially the same as the size of a single pixel or dot printed using the predetermined resolution.

14. A covert material for printing onto a printing medium comprising:
   a covert pigment, the covert pigment viewable using a specific wavelength of light; and
   a binder encapsulating the covert pigment to form an encapsulated covert pigment particle, where the binder comprises at least one of cellulose acetate butyrate (CAB), butyral vinyl acetate, acetyl butyrate, and acetate butyrate, wherein the covert pigment comprises about 0.5-5% of the covert material.

15. A covert material for printing onto a printing medium comprising:
   a covert pigment, the covert pigment viewable using a specific wavelength of light; and
   a binder encapsulating the covert pigment to form an encapsulated covert pigment particle, where the binder comprises at least one of cellulose acetate butyrate (CAB), butyral vinyl acetate, acetyl butyrate, and acetate butyrate, wherein the binder comprises about 5-30% of the covert material.

16. A covert material for printing onto a printing medium comprising:
a covert pigment, the covert pigment viewable using a specific wavelength of light; and
a binder encapsulating the covert pigment to form an encapsulated covert pigment particle, where the binder comprises at least one of cellulose acetate butyrate (CAB), butyral vinyl acetate, acetyl butyrate, and acetate butyrate, wherein the binder comprises about 20-25% of the covert material.

17. A covert material for printing onto a printing medium comprising:
a covert pigment, the covert pigment viewable using a specific wavelength of light; and
a binder encapsulating the covert pigment to form an encapsulated covert pigment particle, where the binder comprises at least one of cellulose acetate butyrate (CAB), butyral vinyl acetate, acetyl butyrate, and acetate butyrate, further comprising about 28-28% ethyl acetate and about 42-55 n-propyl acetate.

18. A covert material for printing onto a printing medium comprising:
a covert pigment, the covert pigment viewable using a specific wavelength of light; and
a binder encapsulating the covert pigment to form an encapsulated covert pigment particle, where the binder comprises at least one of cellulose acetate butyrate (CAB), butyral vinyl acetate, acetyl butyrate, and acetate butyrate, wherein the covert material is constructed and arranged to satisfy a predetermined number of the NCITS 322 tests.

19. A covert material for printing onto a printing medium comprising:
a covert pigment, the covert pigment viewable using a specific wavelength of light; and
a binder encapsulating the covert pigment to form an encapsulated covert pigment particle, where the binder comprises at least one of cellulose acetate butyrate (CAB), butyral vinyl acetate, acetyl butyrate, and acetate butyrate, wherein the covert material is constructed and arranged to satisfy at least one of the following NCITS 322 tests: Surface Abrasion, Image Abrasion, Temperature and Humidity Induced Dye Migration, UV light exposure stability, Daylight Image Stability (Xenon Arc) and Laundry Test.

20. A covert material for printing onto a printing medium comprising:
a covert pigment, the covert pigment viewable using a specific wavelength of light; and
a binder encapsulating the covert pigment to form an encapsulated covert pigment particle, where the binder comprises at least one of cellulose acetate butyrate (CAB), butyral vinyl acetate, acetyl butyrate, and acetate butyrate, wherein the covert material is constructed and arranged to satisfy all of the following NCITS 322 tests: Surface Abrasion, Image Abrasion, Temperature and Humidity Induced Dye Migration, UV light exposure stability, Daylight Image Stability (Xenon Arc) and Laundry Test.

21. A covert material for printing onto a printing medium comprising:
a covert pigment, the covert pigment viewable using a specific wavelength of light; and
an binder encapsulating the covert pigment to form an encapsulated covert pigment particle, where the binder comprises at least one of polyester, polyolefin, acetyl butyrate, acetate butyrate, polystyrene copolymer, and polystyrene-polyvinyl pyridine, further comprising at least one of the following components: a colorant, a surface additive, and a magnetic particle; and
further comprising a solvent extender solution.

22. The covert material of claim 21, wherein the covert material is a component of a toner.

23. The covert material of claim 22, wherein the toner itself further comprises a first sub-component, the first subcomponent comprising at least one of polyester, polyolefin, acetyl butyrate, acetate butyrate, polystyrene copolymer, and polystyrene-polyvinylpyridine.

24. The covert material of claim 23, wherein the binder comprises substantially the same material as the first subcomponent.

25. The covert material of claim 21 wherein the particle has a size greater than 1 micron.

26. The covert material of claim 21 wherein the particle has a size greater than 5 microns.

27. The covert material of claim 21 wherein the particle has a size greater than 20 microns.

28. The covert material of claim 21, wherein the covert printing material is constructed and arranged to be printed using a printer having a predetermined resolution, wherein the particle has a size that is substantially the same as the size of a single pixel or dot printed using the predetermined resolution.

29. A covert material for printing onto a printing medium comprising:
a covert pigment, the covert pigment viewable using a specific wavelength of light; and
an binder encapsulating the covert pigment to form an encapsulated covert pigment particle, where the binder comprises at least one of polyester, polyolefin, acetyl butyrate, acetate butyrate, polystyrene copolymer, and polystyrene-polyvinyl pyridine, wherein the covert material is constructed and arranged to satisfy a predetermined number of the NCITS 322 tests.

30. The covert material of claim 29, wherein the covert material is constructed and arranged to satisfy at least one of the following NCITS 322 tests: Surface Abrasion, Image Abrasion, Temperature and Humidity Induced Dye Migration, UV light exposure stability, Daylight Image Stability (Xenon Arc) and Laundry Test.

31. The covert material of claim 29, wherein the covert material is constructed and arranged to satisfy all of the following NCITS 322 tests: Surface Abrasion, Image Abrasion, Temperature and Humidity Induced Dye Migration, UV light/exposure stability, Daylight Image Stability (Xenon Arc) and Laundry Test.

* * * * *